US005691680A

United States Patent [19]

Schrey et al.

[11] Patent Number: 5,691,680

[45] Date of Patent: Nov. 25, 1997

[54] METHOD OF RECOGNIZING THE IMPINGEMENT OF A RECIPROCATING ARMATURE IN AN ELECTROMAGNETIC ACTUATOR

[75] Inventors: Ekkehard Schrey, Aachen; Lutz Kather, Würselen, both of Germany

[73] Assignee: FEV Motorentechnik GmbH & Co. KG, Aachen, Germany

[21] Appl. No.: 683,973

[22] Filed: Jul. 22, 1996

[30] Foreign Application Priority Data

Jul. 21, 1995 [DE] Germany ........................ 195 26 683.8

[51] Int. Cl.[6] ............................ H01F 3/00; H02K 33/00; H01H 47/00

[52] U.S. Cl. .......................... 335/256; 318/128; 335/228; 335/268; 361/159; 361/187

[58] Field of Search .................................... 318/128, 135; 335/228, 253, 256, 266, 268; 361/159, 167, 187

[56] References Cited

U.S. PATENT DOCUMENTS

| | | | |
|---|---|---|---|
| 4,080,552 | 3/1978 | Brown | 318/128 |
| 4,618,908 | 10/1986 | Anttila | 361/187 |
| 4,908,731 | 3/1990 | Richeson, Jr. | 361/159 |
| 5,293,551 | 3/1994 | Perkins et al. | 361/187 |
| 5,341,032 | 8/1994 | Brambilla et al. | 361/187 |
| 5,347,419 | 9/1994 | Caron et al. | 361/187 |
| 5,488,340 | 1/1996 | Maley et al. | 335/253 |
| 5,537,960 | 7/1996 | Izuo et al. | 123/90.11 |
| 5,548,263 | 8/1996 | Bulgatz et al. | 335/256 |

FOREIGN PATENT DOCUMENTS

| | | |
|---|---|---|
| 35 43 055 | 12/1986 | Germany . |
| 30 24 109 | 9/1989 | Germany . |

*Primary Examiner*—Stuart N. Hecker

*Attorney, Agent, or Firm*—Spencer & Frank

[57] ABSTRACT

A method of recognizing armature impingement in an electromagnetic actuator having an electromagnet including a solenoid, an armature movable toward and away from the electromagnet and return means for exerting a force on the armature. The method includes the steps of maintaining a solenoid current at a predetermined magnitude $I_{max}$ during a predetermined period $T_A$ for capturing the armature at the electromagnet; switching off the solenoid current at a moment $t_1$ upon lapse of the period $T_A$; upon lapse of a period $T_1$ running from moment $t_1$, oscillating the solenoid current between a lower holding current threshold $I_{H1}$ and an upper holding current threshold $I_{H2}$; detecting a current course from moment $t_1$; and deriving a signal from such current course.

5 Claims, 5 Drawing Sheets

METHOD OF RECOGNIZING THE IMPINGEMENT OF A RECIPROCATING ARMATURE IN AN ELECTROMAGNETIC ACTUATOR

CROSS REFERENCE TO RELATED APPLICATION

This application claims the priority of German Application No. 195 26 683.8 filed Jul. 21, 1995, which is incorporated herein by reference.

BACKGROUND OF THE INVENTION

Electromagnetic actuators have at least one electromagnet and a movable armature which is coupled with a setting member to displace the same and which is further coupled with at least one return means. By switching on the solenoid current, the armature is moved from a first position predetermined by the return means to a second position in which the armature lies against the electromagnet. Electromagnetic actuators are used, for example, for controlling engine-cylinder valves in piston-type internal combustion engines. In such an application the electromagnetic actuator has two electromagnets between which the armature is movable against the force of a resetting means by switching off the current flowing through the solenoid of the holding electromagnet and by passing a current through the solenoid of the opposite, capturing electromagnet. By a corresponding control of the individual electromagnetic actuators of the cylinder valves, an inflow and an outflow of gases result, so that the operational process may by optimally influenced according to requirements. The control course has a significant effect on various parameters, for example, the conditions of the gases in the intake zone, in the combustion chamber and in the exhaust zone as well as on operational sequences in the combustion chamber itself. Since piston-type internal combustion engines operate in a non-stationary manner under widely varying working conditions, an adaptable control of the cylinder valves is necessary. Electromagnetic operators for cylinder valves are known, for example, from German Patent No. 3,024,109.

A significant problem in the control of electromagnetic actuators of the above-outlined type resides in the timing accuracy required particularly for the intake valves in the control of engine output. An accurate control of the timing is rendered difficult by manufacturing tolerances, wear of the components and various operational conditions such as alternating load requirements and alternating working frequencies because these external influences too, affect the time-relevant parameters of the system.

An approach for achieving a high control accuracy has been the application of a relatively high energy for capturing the armature at a pole face of an electromagnet. The high energy consumption, however, involves lowering the operational safety because a high energy input is tied to the additional problem of a more pronounced appearance of armature rebound. This problem arises when the armature impinges on the pole face with a high speed and immediately or after a short time period, rebounds therefrom. In electromagnetic actuators used for operating cylinder valves such rebound phenomenon may adversely affect the operation of the engine.

While by evaluating the current and/or voltage course in the solenoid of the electromagnet it is feasible to recognize the moment of armature impingement and its coming to rest on the pole face of the electromagnet as disclosed in German Offenlegungsschrift Nos. 3,515,041 and 3,543,055, with such known processes a direct recognition of the armature rebound has not been possible. Merely the first impingement of the armature could be recognized and/or the fact that the armature has come to rest against the pole face.

SUMMARY OF THE INVENTION

It is an object of the invention to provide an improved method which recognizes armature impingement as well as rebound phenomena.

This object and others to become apparent as the specification progresses, are accomplished by the invention, according to which, briefly stated, the method of recognizing armature impingement in an electromagnetic actuator includes the steps of maintaining a solenoid current at a predetermined magnitude $I_{max}$ during a predetermined period $T_A$ for capturing the armature at the electromagnet of the actuator; switching off the solenoid current at a moment $t_1$ upon lapse of the period $T_A$; upon lapse of a period $T_1$ running from moment $t_1$, oscillating the solenoid current between a lower holding current threshold $I_{H1}$ and an upper holding current threshold $I_{H2}$; detecting a current course from moment $t_1$; and deriving a signal from such current course.

It has been unexpectedly found that with the above-outlined current regulating process a direct recognition of armature rebound is feasible. The process according to the invention advantageously utilizes the fact that after interrupting the solenoid current the latter decays in a delayed manner, corresponding to the delayed decay of the magnetic field. During this period, in case of rebound, the armature moves away from the effective range of the decaying magnetic field. This occurrence affects the course of the diminishing current. Such feedback effects may extend up to the time period in which the holding current is oscillated between a lower holding current threshold and an upper holding current threshold. The influencing of the current course is sufficiently substantial to be able to derive a signal therefrom which makes possible the recognition of armature rebound and accordingly, by means of the device for controlling the electromagnetic actuator, appropriate corrections may be made as concerns the switch-on and switch-off moments as well as the regulation of the solenoid current to achieve an accurate timing of the control start.

According to an advantageous embodiment of the method of the invention, the intensity of the solenoid current $I_p$ is detected at the end of the switch-off period $T_1$. It has been found that the current level $I_p$ during a rebound of the armature is significantly less than the current level which establishes itself in case the armature engages the pole face without rebound and which, as a rule, corresponds to the predetermined lower holding current threshold $I_{H1}$. The switch-off period $T_1$ as well as the lower holding current threshold $I_{H1}$ may be preset. From an actual value/desired value comparison between the predetermined value of the holding current threshold $I_{H1}$ and the actual, significantly lower solenoid current $I_p$ a recognition signal for the armature rebound may be derived. Such signal may be utilized to perform corresponding correcting measures by the control system.

According to another advantageous embodiment of the method of the invention, the moment $t_p$ is detected at which, after the switch-off moment $t_1$, the decreasing solenoid current reaches the predetermined magnitude of the lower holding current threshold $I_{H1}$. Since because of the rebound phenomena the current drop after switch-off occurs much faster, the moment $t_p$ at which the decreasing solenoid current reaches the predetermined value for a lower holding current threshold $I_{H2}$ occurs much sooner than in case of normal operation without rebound.

According to a further advantageous embodiment of the method of the invention, after reaching the lower holding current threshold $I_{H1}$, the solenoid current is switched on for a firmly predetermined clock period $T_f$ and the upper value $I_{max}$ of the solenoid current appearing at the end of the clock period $T_f$ is detected. Since during the holding phase, current regulation occurs between two thresholds, it is in principle possible and conventional to draw conclusions concerning the engagement of the armature at the magnet pole by evaluating the frequency. Such a frequency evaluation, however, requires time and therefore does not allow an immediate recognition. According to the presently discussed embodiment of the invention, however, only the on-period (clock period) $T_f$ for the current is predetermined and at the end of the clock period $T_f$ the attained current value is ascertained. Since, again, such a current is significantly lower than the upper holding current threshold $I_{H2}$ appearing upon engagement of the armature at the magnet pole, a reliable recognition of rebound phenomena is possible. This embodiment advantageously utilizes the circumstance that the oscillation of the solenoid current is triggered when the current reaches the predetermined lower holding current threshold $I_{H1}$ after switching off the constant solenoid current $I_{max}$.

All the embodiments of the method according to the invention are advantageous in that the rebound phenomena may be detected accurately by means of significant deviations from the normal current course and without additional computing steps, resulting in a definite signal which may be processed by the control system.

DESCRIPTION OF THE PREFERRED EMBODIMENTS

Figure 1:
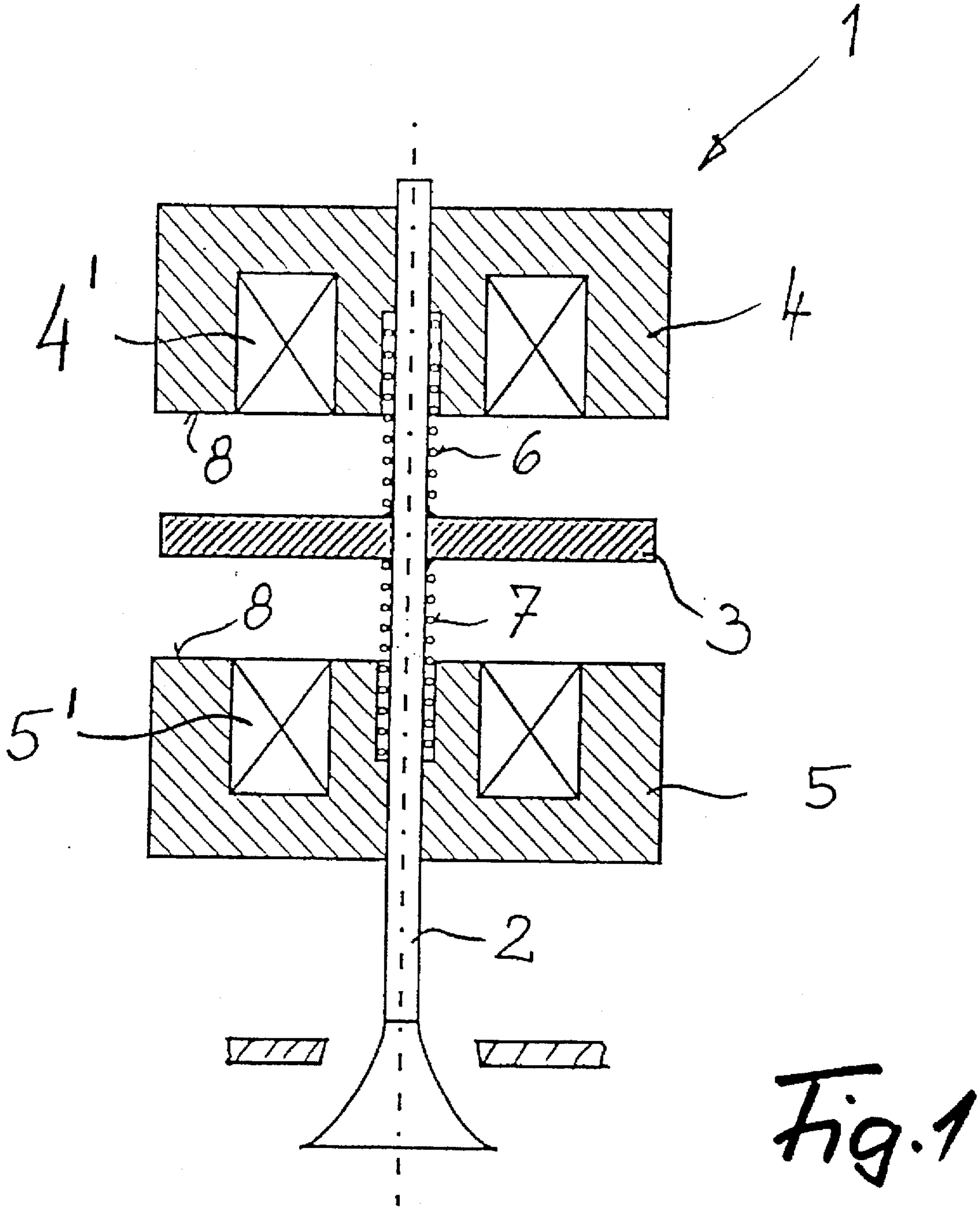
FIG. 1 is a schematic sectional side elevational view of an electromagnetic actuator for a cylinder valve for practicing the method according to the invention.

FIG. 1 schematically illustrates an electromagnetic actuator generally designated at 1, having an armature 3 which is attached to the stem of a cylinder valve 2 as well as a closing magnet 4 and an opening magnet 5 acting on the armature 3. The closing magnet 4 has a solenoid 4' and the opening magnet 5 has a solenoid 5'. Both magnets 4 and 5 have corresponding pole faces 8. In the deenergized state of the magnets 4 and 5 the armature 3 is maintained in a position of rest between the two magnets 4 and 5 by oppositely working return springs 6 and 7.

In the "valve closed" position the armature 3 engages the pole face 8 of the closing magnet 4.

For operating the cylinder valve 2, that is, for initiating a motion from the closed position into the open position, the flow of the holding current through the solenoid 4' of the closing magnet 4 is discontinued. As a result, the holding force of the closing magnet 4 falls below the spring force of the return spring 6 and thus the armature begins its motion, accelerated by the return spring 6. After the armature 3 has traversed the position of rest, its motion is braked by the spring force of the return spring 7 associated with the opening magnet 5. To catch the armature 3 in the open position and to retain it there, the opening magnet 5 is supplied with current. For closing the cylinder valve 2, the above-described switching and motion sequence is effected in the reverse sense.

Figure 1A:
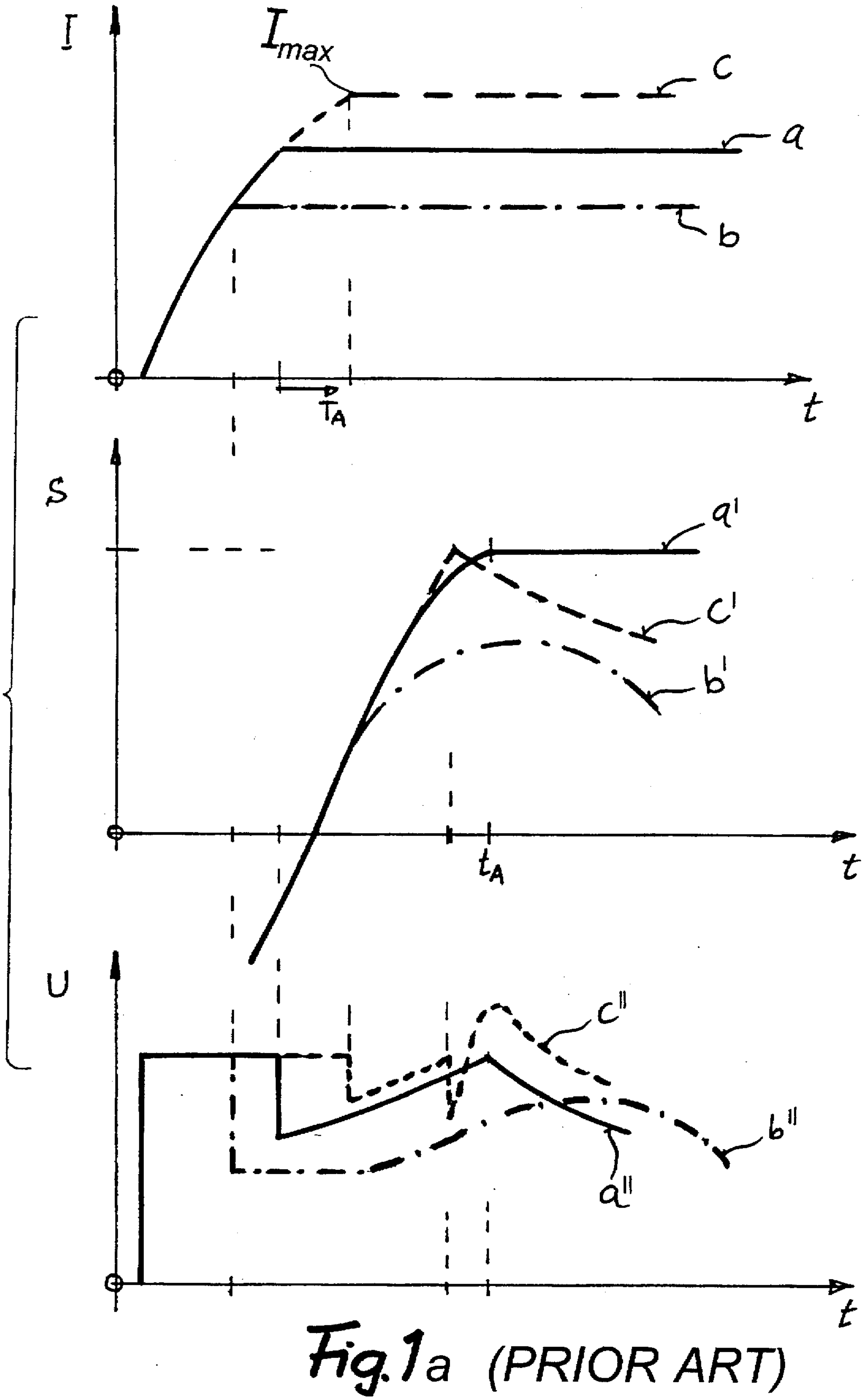
Fig. 1a (PRIOR ART)
FIG. 1*a* is a diagram illustrating the solenoid current, the armature displacement and the solenoid voltage as a function of time for the different displacement conditions obtained by a method according to the prior art.

FIG. 1*a* shows current, displacement and voltage values obtained with a conventional method. Curve a shows the current course in the capturing magnet, obtained during normal operation of the electromagnetic actuator. The current, after switch-on, is increased up to a value $I_{max}$ and thereafter maintained constant throughout a time period. As shown by the displacement/time curve a' for the armature motion, the armature reaches the pole face of the magnet at moment $t_A$ and comes to rest thereon. The corresponding voltage course is designated by the curve a".

If insufficient energy is supplied to the solenoid of the magnet as shown by the solenoid current curve b, the armature does not reach the pole face at all but turns back under the influence of the return means as shown by the displacement curve b'. The corresponding voltage curve is designated at b".

If, on the other hand, excessive energy is supplied to the capturing magnet, that is, the solenoid current is set too high, as shown by the current curve c, then excessive motion energy is applied to the armature so that the armature, after impinging on the pole face of the magnet, first rebounds as shown by the displacement curve c'. As shown by the voltage curve c", the impingement of the armature may also be recognized in the voltage course so that a corresponding signal may be derived therefrom.

The invention, however, as will be discussed in connection with FIGS. 2, 3 and 4, takes a different path which is based on the recognition that the control start has to proceed in a timed manner, that such timing is predetermined by the crankshaft rotation and that the current too, has to be regulated. It has been unexpectedly found that the armature motion, but particularly the rebound phenomena lead to the recognition of significant differences in the course of the current/time curve as compared to the normal operation so that from the current course after turning off the current following a constant phase, any rebound phenomenon may be detected and corresponding signals may be derived.

Figure 2:
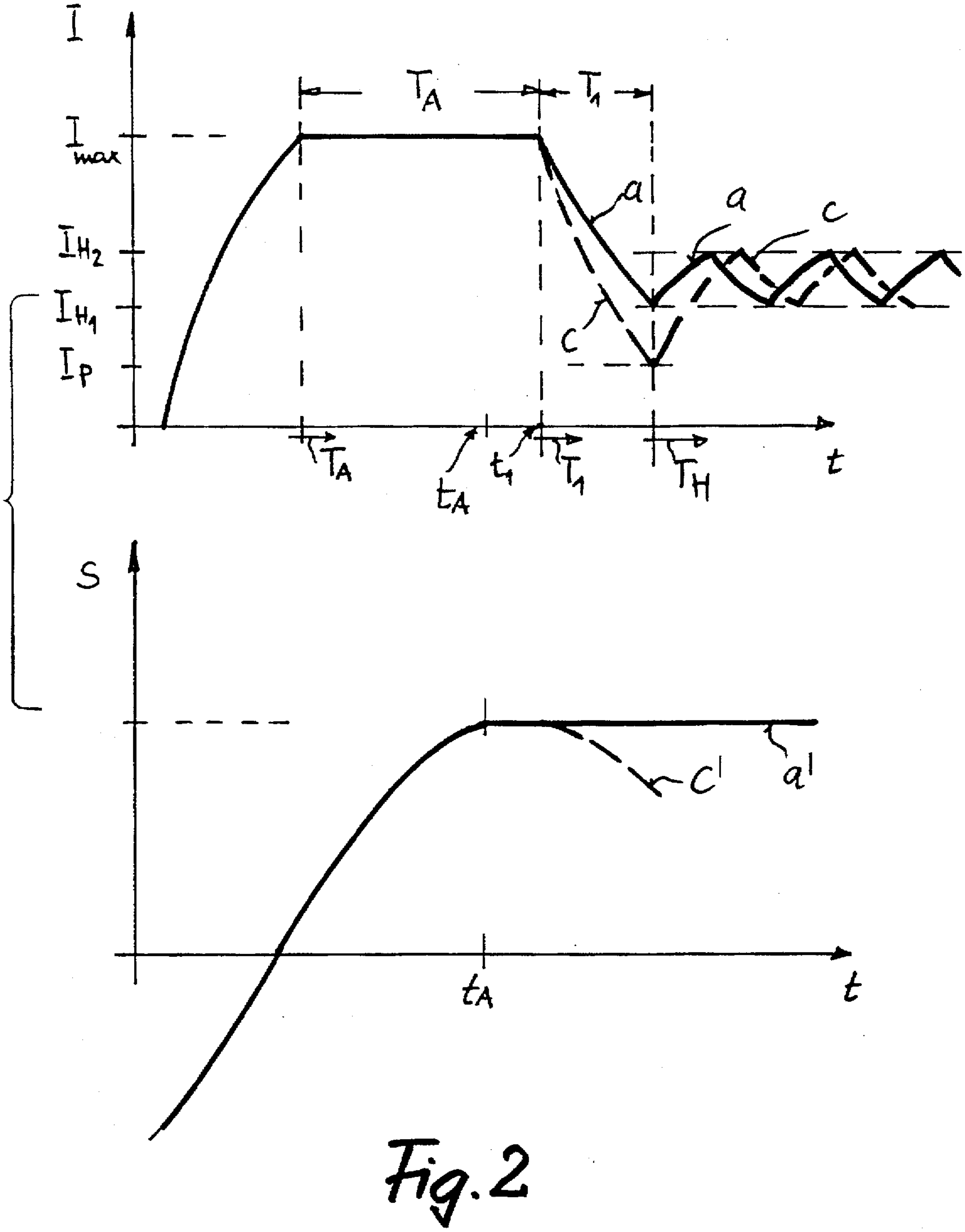
FIG. 2 is a diagram illustrating the solenoid current and the armature displacement as a function of time obtained with a first preferred embodiment of the method of the invention.

In the method illustrated in FIG. 2 the current is first increased to a presettable value $I_{max}$ which is maintained at a constant value throughout a certain initial time period $T_A$. The duration $T_A$ is designed such that it extends beyond the expected moment $t_A$ at which the armature impinges on the pole face of the electromagnet. Upon lapse of the period $T_A$, at the moment $t_1$ the current is first switched off, since a lesser current suffices for holding the armature at the electromagnet. The current decay following the switch-off may be extended by means of a free run (such as a free run thyristor) provided in the associated circuit. To reduce the current consumption in this arrangement, it is conventional to oscillate the current during the holding period $T_H$ between a lower threshold value $I_{H1}$ and an upper threshold value $I_{H2}$.

To recognize rebound phenomena, according to the process of FIG. 2, the current is interrupted at moment $t_1$ for a positively predetermined period $T_1$, whereupon the current drops corresponding to the decay of the magnetic field. After lapse of the period $T_1$, the current is again switched on and each time it reaches the predetermined upper holding current threshold $I_{H2}$ it is switched off and then continuously oscillated between the lower and upper current threshold $I_{H1}$ and $I_{H2}$. The lower current threshold $I_{H1}$ is set to such a value that the armature is reliably held at the magnet pole. If the armature comes to rest against the magnet pole, then during the period $T_1$ a current according to the current curve a is obtained. As shown by the associated displacement curve a', during this period no movement of the armature takes place.

If, however, the predetermined constant current $I_{max}$ is too high, resulting in a rebound phenomenon for the armature and thus the armature moves according to the displacement curve c', during the period $T_1$ for the solenoid current a much steeper current drop is obtained, so that after lapse of the duration $T_1$ the solenoid current reaches the value $I_p$ which lies significantly below the level of the current threshold $I_{H1}$. Thus, from a comparison between $I_{H1}$ and $I_p$ a distinct signal may be derived for recognizing the rebound phenomenon. Since after lapse of the period $T_1$ the current is again switched on and thus first rises to the level of the upper current threshold $I_{H2}$, during the oscillation period $T_H$ the timely shifted course for the current is obtained as shown by the current curve c in FIG. 2.

Figure 3:
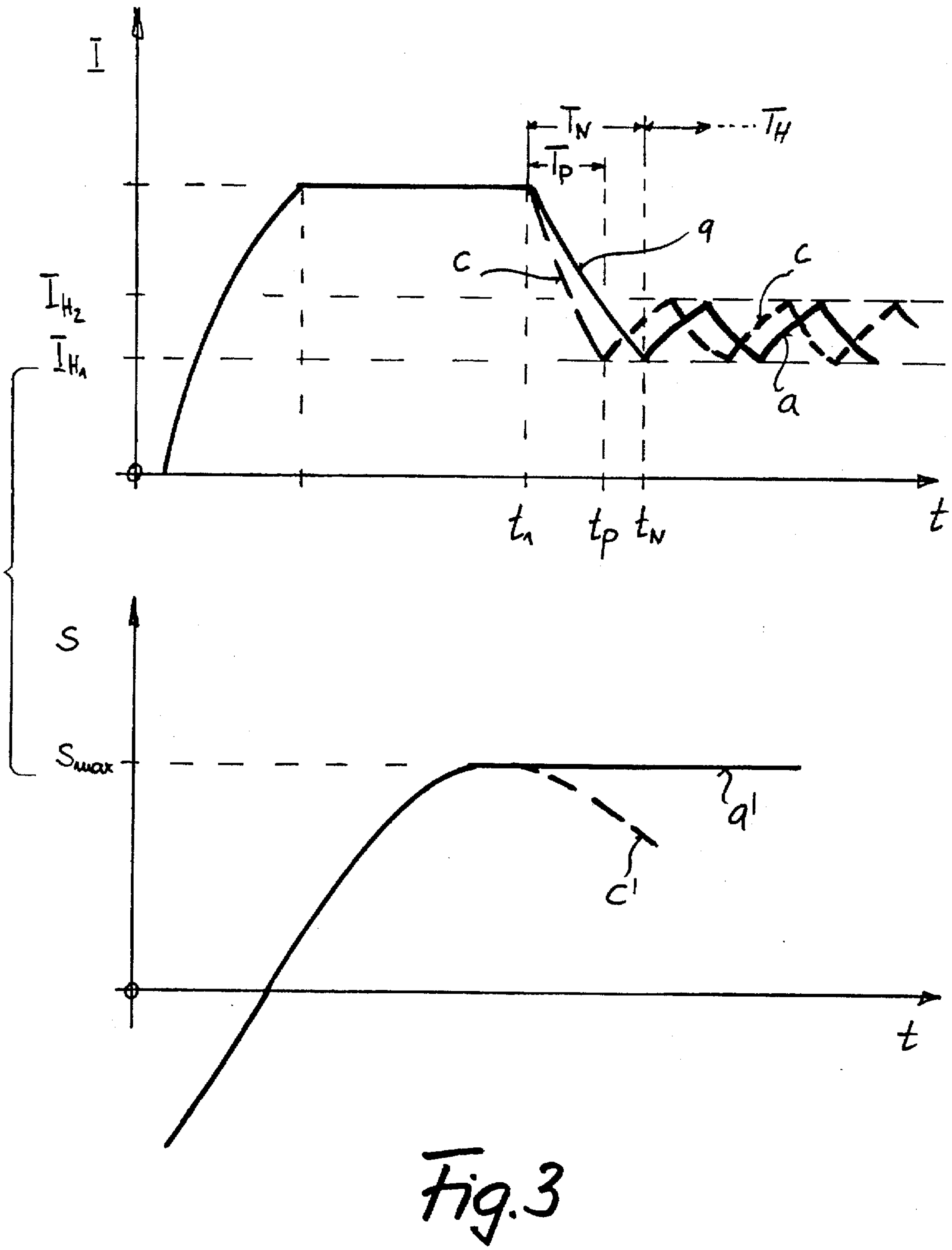
FIG. 3 is a diagram illustrating the solenoid current and the armature displacement as a function of time obtained with a second preferred embodiment of the invention.

FIG. 3 illustrates a process which is a variant of the process discussed in connection with FIG. 2. In the process according to FIG. 3, the lower holding current threshold $I_{H1}$ is preset for the holding current phase $T_H$, so that after switching off the current at moment $t_1$ upon the lapse of the period $T_A$, an oscillation between the lower holding current threshold $I_{H1}$ and the upper holding current threshold $I_{H2}$ may start as soon as the solenoid current has reached the value of the lower holding current threshold $I_{H1}$.

Instead of setting a fixed deenergized period $T_1$ as described in connection with FIG. 2, according to the process of FIG. 3 the period is measured which lapses between the switch-off moment $t_1$ and the moment in which the solenoid current drops to the value of the lower holding current threshold $I_{H1}$.

In case the armature impinges on the pole face of the electromagnet without rebound, between the moment $t_1$ when the solenoid current is switched off and the moment $t_N$ when the lower holding current threshold $I_{H1}$ is reached, a period $T_N$ elapses, so the oscillating holding period $T_H$ starts only when the moment $t_N$ is reached. The associated armature motion is indicated by the displacement curve a' in FIG. 3.

In case a rebound phenomenon occurs as shown by the current portion c' in FIG. 3, then, as already described earlier in connection with FIG. 2, there occurs a much more pronounced drop of the solenoid current so that the lower holding current threshold $I_{H1}$ is reached much sooner at a moment $t_p$ than during a normal engagement (coming to rest) of the armature at the pole face. By comparing the period $T_p$ lasting from the deenergization of the solenoid current at moment $t_1$ until the moment $t_p$ with the duration $T_N$, a rebound of the armature may be unequivocally recognized and a signal derived therefrom, by means of which, for example, the intensity of the current $I_{max}$ may be reduced with a corresponding control, so that in the subsequent cycles a rebound of the armature is avoided and an accurate timing of the actuator is obtained.

Figure 4:
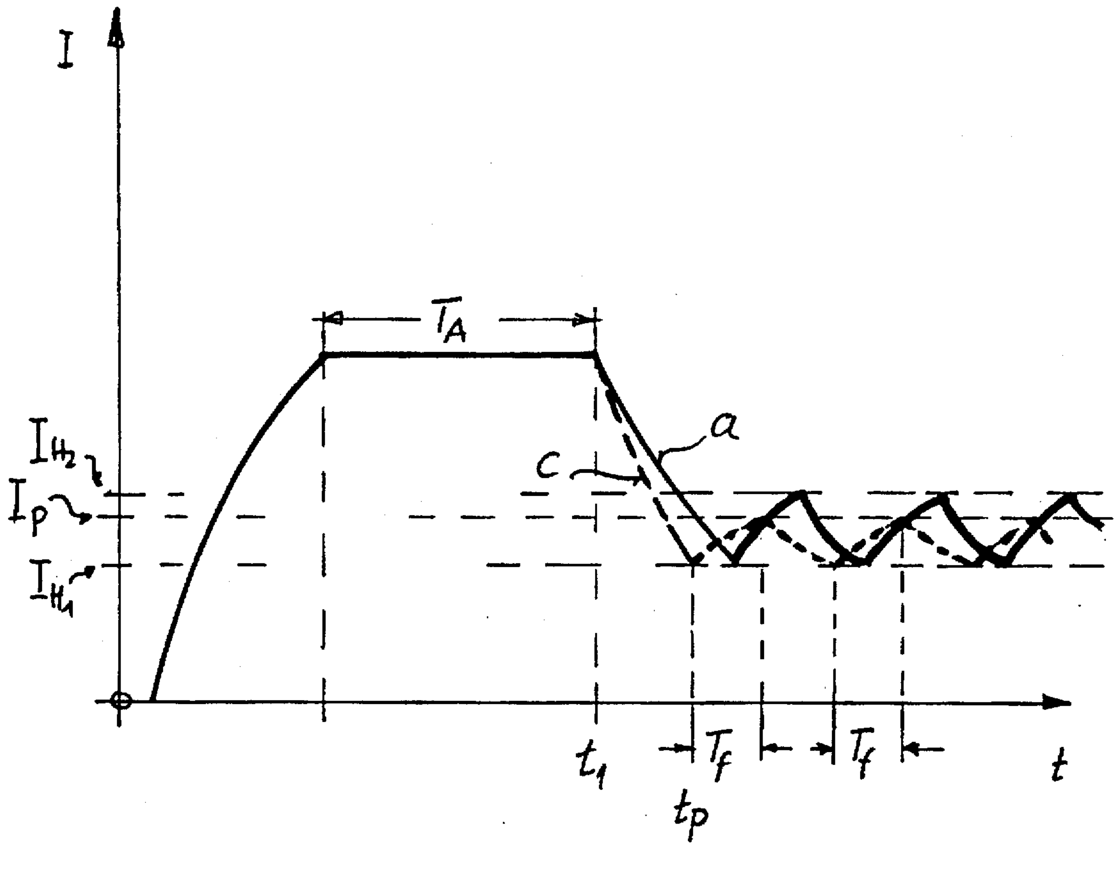
FIG. 4 is a diagram similar to FIG. 3 illustrating predetermined values for a further preferred embodiment of the process of the invention.

FIG. 4 illustrates a variant of the method shown in FIG. 3. In the process according to FIG. 4, after switching off the constant current at the moment $t_1$ upon reaching the preset lower holding current threshold $I_{H1}$, the holding current is oscillated. Departing from the process according to FIG. 3, however, the oscillation does not occur between the preset lower holding current threshold $I_{H1}$ and a fixed predetermined upper holding current threshold $I_{H2}$; rather, a fixed clock period $T_f$ is set and in each instance the upper current value reached at the end of the preset period $T_f$ is determined. In case the armature comes to rest against the pole face of the electromagnet a previously determined upper limit $I_{H2}$ may be reached. In case of a rebound of the armature, however, the upper current value $I_p$ that may be reached is significantly lower so that from this occurrence a signal may be derived which may be utilized in a control device.

An advantageous mode of evaluation of the signals obtained with the method according to the invention is possible in that for the operating condition to be controlled by the electromagnetic actuator, a desired curve or a desired curve group is predetermined and in each instance the curve of the actual current course may be compared with the curve of the desired current course. In case deviations result from the comparison, such deviations may be utilized by the control device to affect the solenoid current. The response behavior is improved since deviations may be detected at an early moment.

It will be understood that the above description of the present invention is susceptible to various modifications, changes and adaptations, and the same are intended to be comprehended within the meaning and range of equivalents of the appended claims.

What is claimed is:

1. A method of recognizing armature impingement in an electromagnetic actuator having an electromagnet including a solenoid, an armature movable toward and away from the electromagnet and return means for exerting a force on the armature, comprising the following steps:

(a) maintaining a solenoid current at a predetermined magnitude $I_{max}$ during a predetermined period $T_A$ for capturing the armature at the electromagnet;

(b) switching off the solenoid current at a moment $t_1$ upon lapse of the period $T_A$;

(c) upon lapse of a period $T_1$ running from moment $t_1$, oscillating the solenoid current between a lower holding current threshold $I_{H1}$ and an upper holding current threshold $I_{H2}$;

(d) detecting a current course from moment $t_1$; and (e) deriving a signal from said current course.

2. The method as defined in claim 1, further comprising the step of detecting the magnitude $I_p$ of the solenoid current at the end of period $T_1$.

3. The method as defined in claim 1, further comprising the step of detecting a moment $t_p$ which is subsequent to moment $t_1$ and at which the solenoid current decreases to the magnitude of said lower holding current threshold $I_{H1}$.

4. The method as defined in claim 1, wherein said oscillating step comprises the step of switching on the solenoid current for predetermined consecutive clock periods $T_f$ and detecting the maximum values of the solenoid current at the end of the clock periods.

5. The method as defined in claim 1, further comprising the step of detecting a first current curve representing the course of an actual solenoid current passing through the electromagnet and comparing said first current curve with a second current curve representing the course of a predetermined desired solenoid current for the electromagnet.

* * * * *